Figure 1:
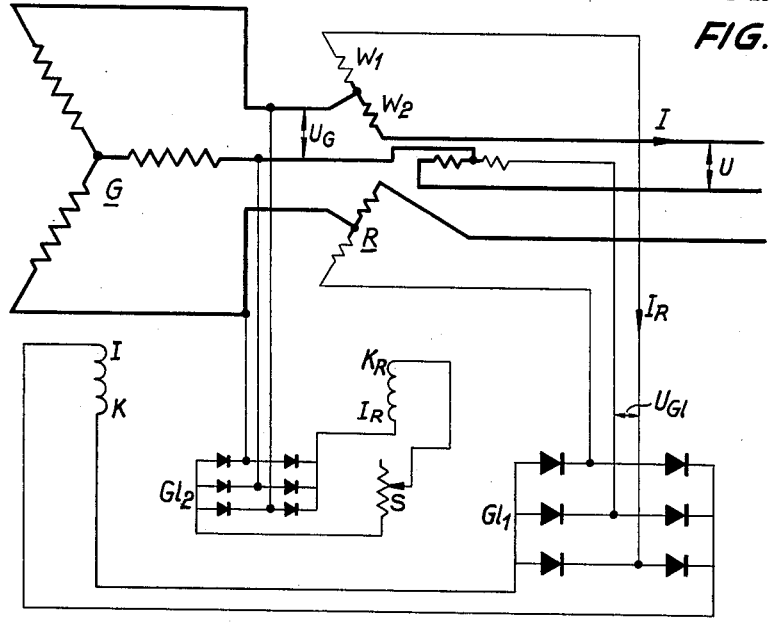

April 24, 1962 E. RONA 3,031,607
COLLECTOR-FREE COMPOUNDED SYNCHRONOUS GENERATOR
Filed Nov. 17, 1959 2 Sheets-Sheet 1

INVENTOR
Emil RONA by:
Michael S. Striker
Attorney

INVENTOR
Emil RONA
by:
Michael S. Striker
Attorney

United States Patent Office 3,031,607
Patented Apr. 24, 1962

3,031,607
COLLECTOR-FREE COMPOUNDED SYN-
CHRONOUS GENERATOR
Emil Rona, Steinstrasse 36, Ingolstadt (Danube)
Neu-Unsernherrn, Germany
Filed Nov. 17, 1959, Ser. No. 853,510
Claims priority, application Germany Nov. 17, 1958
6 Claims. (Cl. 322—25)

The excitation of alternating current generators, especially three-phase generators is composed of a voltage-responsive no-load excitation and an additional excitation responsive to current and power factors, and is tapped from the generator itself, or from a special excitation machine or from the joint operation of the two. In order to maintain the generator voltage constant a good deal of automatic regulating devices externally of the generator and compounding systems internally of the generator have become known, however, these devices are more or less unsatisfactory for reasons of the contacts, of safety regulators and the inertia factor thereof, or the collecting rings of external pole generators and their complicated switching for several voltages, or the commutators of the excitation systems or the greater consumption of idle power for the regulating apparatus etc.

These disadvantages are avoided in the collector-free compounded synchronous generator comprising an automatic voltage regulation which according to the invention is substantially characterized by a regulating machine circumferentially adjustable coupled to the generator and having two stator windings and a pole wheel with direct current excitation the one stator winding of which supplying exciter current in series connection with the generator winding or in connection with a tapping thereof or with a special auxiliary winding of the generator pole wheel widing over a main rectifier, the second stator winding of which being bye-passed by a loading current of the generator and the pole wheel winding of which being fed with direct current.

Such a voltage regulation requires collecting rings indispensable only for pole wheel excitation, is applicable to any revolving field generator and, besides further advantages, does not require but a minimum amount of material for generator and regulating member, this especially so as it is possible to work at a higher saturation and as the excitation output can be essentially supplied by the regulation member.

The pole wheel of the regulating machine can be formed so as to have defined leg poles, or it can—which is less expensive from the point of view of manufacture—be grooved either continuously or intermittently in the direction of the longitudinal axis in the case of leg pole structure according to the turbo-rotor type.

For adapting purposes to the individual operation conditions the axes of the windings of the regulation machine are preferably adjustable to the axes of the generator windings by rotation of the stator or pole wheel or the regulating machine, and the axes of the regulating machine are possibly adjustable with respect to one another by a cyclical exchange of the individual windings.

The two stator windings of the regulating machine can also be combined to one winding in low battery drain connection.

The pole wheel winding of the exciter machine can be energized over a shunt rectifier or the main rectifier, however, it can also be subdivided into two windings for combined excitation through two different voltages.

Similarly, the generator pole wheel winding for combined excitation can be subdivided into two windings, one of said windings being energized over a special rectifier, for example, over the above-mentioned shunt rectifier, by the generator or supply voltage, and the other winding being energized by said main rectifier.

It may, furthermore, be advantageous to tap the excitation of the generator pole wheel from the stator winding of the regulating machine which winding is short-circuited over the main rectifier.

Figures 2A, 2B, 2C:
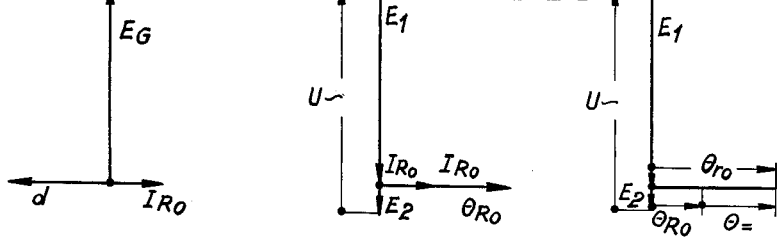
Figure 3:
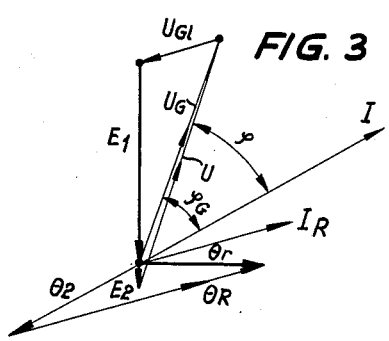
Figure 4:
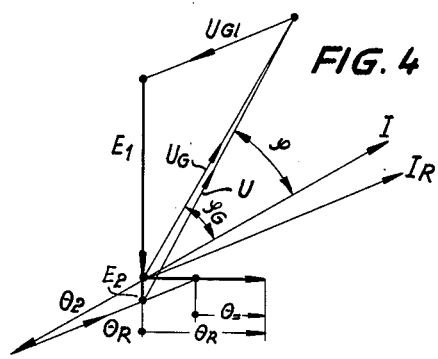
Figure 5:
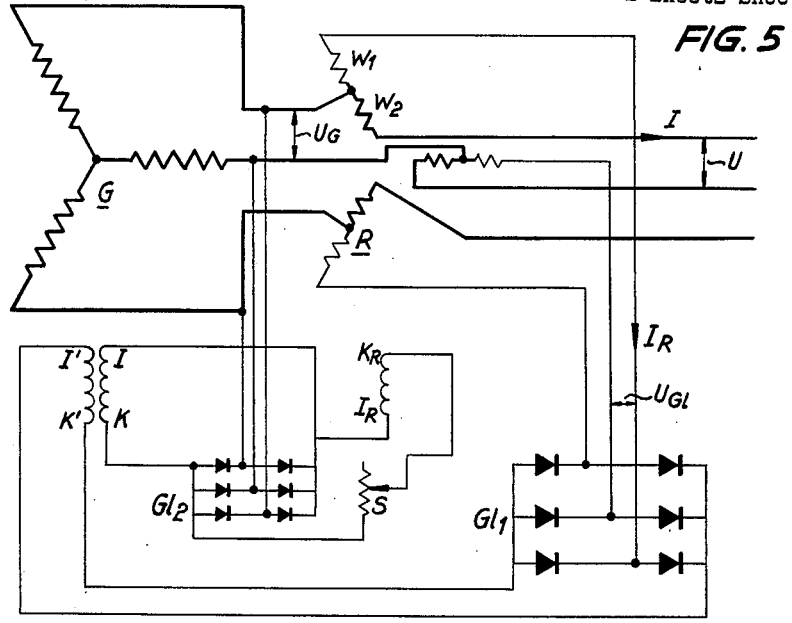
Figure 6:
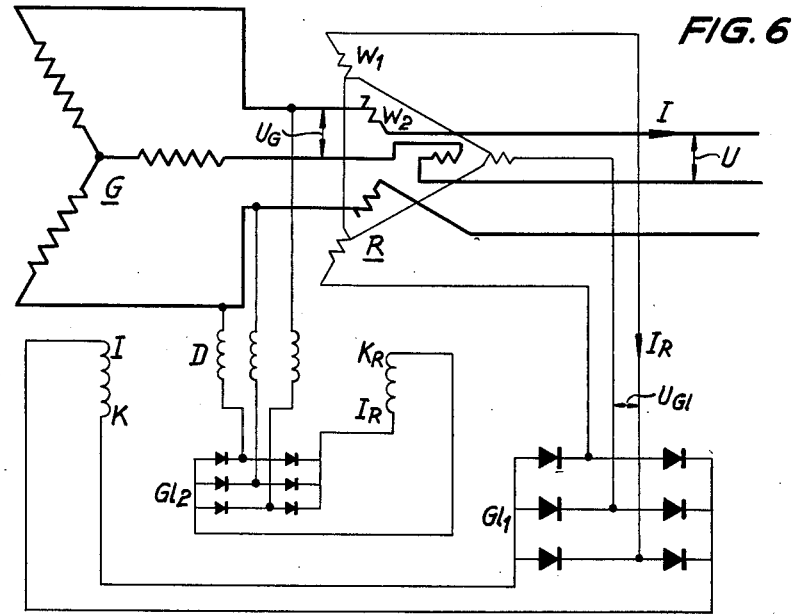

The invention will now be described more fully by way of example with reference to the accompanying drawings in which:

FIG. 1 schematically shows one embodiment of the voltage-regulated generator according to the invention, FIGS. 2a, 2b, and 2c show current-voltage vector diagrams during idling (for open circuit operation), FIGS. 3 and 4 show current voltage-vector diagrams when the generator is loaded, FIG. 5 shows a modified embodiment according to the invention, and FIG. 6 shows a further embodiment of the invention.

As illustrated in FIG. 1 the regulating member is a rotating machine R coupled to the generator G, said member having corresponding properties in respect of structure and ventilation. The generator itself has a standard structure and comprises a single pole wheel winding IK energized by rectifier $G1_1$ (main rectifier) over two collecting rings. The regulating machine R has the same number of poles as the generator. The stator thereof is rotatable for adjusting the phase position and it carries two windings $W_1$ and $W_2$ arranged separately or in low battery drain connection, which windings are cross-connected. Winding $W_1$ carries the exciter current $I_R$ tapped from the generator, winding $W_2$ carries the load current I. The two windings are co-axially positioned, however, they can also be rotated relative to one another for varying the coupling degree, for example by way of connection through cyclically exchanging the winding elements.

The exciter current $I_R$ can also be taken from a tapping of the generator winding or a special auxiliary winding in the generator.

The pole wheel of the machine R has a small exciter winding $I_R K_R$ energized by the generator voltage $U_G$ over a shunt rectifier $G1_2$.

With reference to the function it is started from the idling and from the fact that the direct current circulation of the pole wheel of R is zero and that the two pole wheel windings, i.e. the longitudinal or d-axes are unidirectional. The idling exciter current $I_{R_0}$ building up the field in the regulating machine R and in the generator G follows the generator idling voltage $E_G$ substantially by 90°, whereas the generator field follows the d-axis by 180° (FIG. 2a). The voltage $E_G$ is almost used up by the electromotive force (EMK) $E_1$ of the winding $W_1$ generated in the regulating machine by $I_{R_0}$ as the power component $U_{G1}$ is comparatively low over $E_G$. Accordingly, the following geometric voltage equation is applicable:

$$\dot{E}_G + \overset{\circ}{E}_1 + \dot{U}_{G1} = 0$$

In machine R the current $I_{R_0}$ or the circulation $\theta_{R_0}$ as demonstrated in FIG. 2b advances the electromotive force (EMK) $E_1$ by 90°. The electromotive force (EMK) $E_2$ of winding $W_2$ generated in accordance with the winding ratio of $W_1$ to $W_2$ is in phase with $E_1$, which winding $W_2$ increase the generator voltage to the supply voltage:

$$\dot{E}_G + (-E_2) = U$$

If the direct current circulation $\theta_=$ is not zero, for example positive, i.e. in the direction of $\theta_{R_0}$ (FIG. 2c), and if $E_G$ and, accordingly, the resulting circulation $\theta_{r_0}$ is to be maintained in the regulating machine, $\theta_{R_0}$ and, accordingly, $I_{R_0}$ must decrease about the amount of $\theta_=$. Conversely, $I_{R_0}$ must increase if $\theta_=$ is counter directed to $\theta_{R_0}$. By varying $\theta_=$ it is readily possible to correctly adjust the exciter current during idling which current is required by the generator, or to conveniently adjust the voltage by a small adjuster S for regulating the ideal value.

When loading the generator with the current I (FIG. 3) following the voltage $U_G$ about the angle $\varphi_G$ the current I in the winding $W_2$ provides for a demagnetizing effect and consequently, suddenly develops a corresponding current $I_R$, so that the resulting current $I_R$ is safeguarded for maintaining the field which current must be maintained for the generation of counter electromotive force (EMK) $E_1$.

The circulations corresponding to the currents are geometrically composed as follows:

$$\theta_r = \theta_2 + \theta_R$$

Introduction of current I into the regulating machine causes an undelayed and considerable increase of $I_R$ and, accordingly, of the pole wheel excitation although the resulting circulation $\theta_r$ arising from the magnetizing curve as a function of $E_1$ slightly deviates from $\theta_{r0}$, however, not too much.

If the minor drops caused by the winding resistances and the scattering of R are neglected the following equations can be applied to the voltages:

$$\dot{U}_G + \dot{U}_{G1} + \dot{E}_1 = 0$$

and $$\dot{U}_G + (-\dot{E}_2) = \dot{U}$$

It is to be noted from the geometry of the current and voltage triangles of FIG. 3 that the power component $U_{G1}$ deviates from the 90° position to $E_1$ so that the machine R must also generate active power supplied through the shaft.

FIG. 4 demonstrates the state for the addition of direct current circulation $\theta_=$ under load, and the equation of the circulation polygon reads as follows:

$$\theta_r = \theta_2 + \theta_R + \theta_=$$

The proportion of the vectors $U_{G1}$ according to FIGS. 3 and 4 shows the increase of the current $I_R$ through the direct current excitation $\theta_=$.

The increase of $I_R$ reaches its maximum rate at cos. $\varphi = 0$ in inductive relation, and decreases at cos. $\varphi = 1$, reaches its minimum rate at capacitive load.

It is relatively simple to adapt the qualities of the regulating machine to the excitation requirements of the generator for constant voltage.

A means for this end is the selection of a corresponding winding ratio, the rotation of the windings and pole axes with respect to one another, the difference of the reactances in the longitudinal and transverse axes, the amount of the direct current circulation and the amount of saturation. Under circumstances the adaptation can be facilitated by the known subdivision of the generator excitation (FIG. 5) into a no-load excitation IK tapped from the supply or generator voltage over a special rectifier, and a load-responsive additional excitation I'K' supplied over the regulating machine. However, this will require two rotating generator exciter windings having four collecting rings.

A further means for adapting purposes is also the selection of another voltage for the direct current circulation $\theta_=$ of the winding $I_R K_R$, for example, the voltage $U_{G1}$, i.e. parallel to IK, or of the voltage of winding $W_2$.

Furthermore, $I_R K_R$ can also be energized over a combined transformer having a rectifier, by a constant voltage and, additionally, by a load-responsive voltage.

A further possibility resides in that the winding $I_R K_R$ is divided into a winding energized by a constant voltage and into a winding energized by a load-responsive voltage.

The direct current circulation $\theta_=$ thus permits a convenient adjustment, higher saturation and reduced dimensions and results in an increase in the stability at capacitive load and parallel operation. Furthermore, it influences the reexcitation process in such a way that in positive connection the built-up of $\theta_=$ is delayed thereby previously putting fully into effect the circulation $\theta_R$, over-shooting included therein, and shortening the excitation process which can be further sped up by a provisional short-circuiting of the winding $W_2$.

It is a further advantage of the direct current circulation in positive connection to reduce the influence of the speed on the voltage. This is explained during idling. If the speed is for example increased by 2% the voltages $U_G$, $E_1$ and $E_2$ will also increase provided that the excitation current $I_{R0}$ remain constant. $\theta_=$ also increases by 2%. However, as the resulting circulation $\theta_{r0} = \theta_= + \theta_{R0}$ has to remain constant on account of the frequency despite the increasing electromotive force (EMK) $E_1$, IR decreases, i.e. the generator voltage increases by less than 2% until there is a balance.

The regulating system is not sensitive to heat on account of the reactance effect, furthermore, there is a voltage-increasing effect of the direct current exciter winding in positive connection at increasing heat which results from the above statements in regard of the influence of the speed.

FIG. 6 discloses a special embodiment of the invention. The winding $W_1$ is not connected in series with the generator winding as in the examples explained above, but is rather star connected by itself. The current of the direct current circulation $\theta_{=of}$ the winding $I_R K_R$ can again be tapped from the generator voltage $U_G$ either directly or over a yoke D for eliminating the heat sensitivity. The direct current circulation develops the no-load excitation current $I_{R0}$ in the regulating machine R. The effect at load is like the effect of a current transformer.

While interposing insulating transformers or by employing special low-volt windings in the generator and the regulating machine the application of the invention is also possible in the case of high voltage generators.

The excitation of the pole wheel of the regulating machine can also be taken from a foreign current source, however, in this case some of its effects would be lost.

What is claimed is:

1. A synchronous alternating voltage generator, comprising, in combination, stationary armature means including alternating current winding means; rotary field means cooperating with said armature means and including direct current field winding means and a predetermined number of pole members; regulating exciter means including non-rotating, but circumferentially adjustable armature means having voltage coil means arranged to derive exciter voltage from voltage generated across said alternating current winding means, and current coil means connected in series with said alternating current winding means, and rotary pole wheel means coupled with said rotary field means for joint rotation therewith and having the same number of pole members as said rotary field means, and direct current exciter coil means thereon; first stationary rectifier means connected between said voltage coil means and said direct current field winding means for exciting the latter with direct current; and second stationary rectifier means and variable impedance means in series-connection with each other and connected between said alternating current winding means and said direct current exciter coil means for supplying the latter with direct current.

2. A synchronous alternating voltage generator, comprising, in combination, stationary armature means including alternating current winding means; rotary field means cooperating with said armature means including direct current field winding means and a predetermined number of pole members; regulating exciter means including non-rotating, but circumferentially adjustable armature means having voltage coil means arranged to derive exciter voltage from voltage generated across said alternating current winding means, and current coil means connected in series with said alternating current winding means, and rotary pole wheel means coupled with said rotary field means for joint rotation therewith and having the same number of pole members as said rotary field means, and direct current exciter coil means thereon; first stationary rectifier means connected between said voltage coil means and said direct current field winding means for exciting the latter with direct current; and second stationary rectifier means and variable impedance means including choke coil means in series-connection with each other and connected between said alternating current winding means and said direct current exciter coil means for supplying the latter with direct current.

3. A synchronous alternating voltage generator, comprising, in combination, stationary armature means including alternating current winding means; rotary field means cooperating with said armature means and including direct current field winding means and a predetermined number of pole members; regulating exciter means including non-rotating, but circumferentially adjustable armature means having voltage coil means connected in series with said alternating current winding means, and current coil means connected in series with said alternating current winding means, and rotary pole wheel means coupled with said rotary field means for joint rotation therewith and having the same number of pole members as said rotary field means, and direct current exciter coil means thereon; first stationary rectifier means connected between said series-connected voltage coil and alternating current winding means and said direct current field winding means for exciting the latter with direct current; and second stationary rectifier means and variable impedance means in series-connection with each other and connected between said alternating current winding means and said direct current exciter coil means for supplying the latter with direct current.

4. A synchronous alternating voltage generator, comprising, in combination, stationary armature means including alternating current winding means; rotary field means cooperating with said armature means and including direct current field winding means and a predetermined number of pole members; regulating exciter means including non-rotating, but circumferentially adjustable armature means having voltage coil means connected in series with said alternating current winding means, and current coil means connected in series with said alternating current winding means, and rotary pole wheel means coupled with said rotary field means for joint rotation therewith and having the same number of pole members as said rotary field means, and direct current exciter coil means thereon; first stationary rectifier means connected between said series-connected voltage coil and alternating current winding means and said direct current field winding means for exciting the latter with direct current; and second stationary rectifier means and variable impedance means including choke coil means in series-connection with each other and connected between said alternating current winding means and said direct current exciter coil means for supplying the latter with direct current.

5. A synchronous alternating voltage generator, comprising, in combination, stationary armature means including main alternating current winding means for furnishing load current, and secondary alternating current winding means for furnishing exciter current; rotary field means cooperating with said armature means and including direct current field winding means and a predetermined number of pole members; regulating exciter means including non-rotating, but circumferentially adjustable armature means having voltage coil means arranged to derive exciter voltage from voltage generated across said alternating current winding means, and current coil means connected in series with said main alternating current winding means, and rotary pole wheel means coupled with said rotary field means for joint rotation therewith and having the same number of pole members as said rotary field means, and direct current exciter coil means thereon; first stationary rectifier means connected between said secondary current winding means, and voltage coil means and said direct current field winding means for exciting the latter with direct current; and second stationary rectifier means and variable impedance means in series-connection with each other and connected between said secondary alternating current winding means and said direct current exciter coil means for supplying the latter with direct current.

6. A synchronous alternating voltage generator, comprising, in combination, stationary armature means including main alternating current winding means for furnishing load current, and secondary alternating current winding means for furnishing exciter current; rotary field means cooperating with said armature means and including direct current field winding means and a predetermined number of pole members; regulating exciter means including non-rotating, but circumferentially adjustable armature means having voltage coil means arranged to derive exciter voltage from voltage generated across said alternating current winding means, and current coil means connected in series with said main alternating current winding means, and rotary pole wheel means coupled with said rotary field means for joint rotation therewith and having the same number of pole members as said rotary field means, and direct current exciter coil means thereon; first stationary rectifier means connected between said secondary alternating current winding means, said voltage coil means and said direct current field winding means for exciting the latter with direct current; and second stationary rectifier means and variable impedance means including choke coil means in series-connection with each other and connected between said secondary alternating current winding means and said direct current exciter coil means for supplying the latter with direct current.

References Cited in the file of this patent
UNITED STATES PATENTS
2,913,656    Bliss _____ Nov. 17, 1959